Jan. 6, 1970   R. H. RILEY, JR., ET AL   3,487,728
APPARATUS FOR HOLE CUTTING
Filed April 15, 1966   3 Sheets-Sheet 1

INVENTORS
ROBERT H. RILEY, JR.
RICHARD F. KOEN
ALLEN E. HOLMES
BY Arnold & Roylance
ATTORNEYS

United States Patent Office 3,487,728
Patented Jan. 6, 1970

3,487,728
APPARATUS FOR HOLE CUTTING
Robert H. Riley, Jr., Towson, Richard F. Koen, Lutherville, and Allen E. Holmes, Baltimore, Md.; said Holmes assignor to Martin-Marietta Corporation, New York, N.Y., a corporation of Maryland, and said Riley and said Koen assignors to The Black and Decker Manufacturing Company, Towson, Md., a corporation of Maryland
Filed Apr. 15, 1966, Ser. No. 542,769
Int. Cl. B23b 45/14
U.S. Cl. 77—13
15 Claims

ABSTRACT OF THE DISCLOSURE

A low reaction tool for hole cutting in which forces usually transmitted to the workman operating the tool are completely eliminated. The tool and method of the invention have particular utility in outer space where there is no gravity. The tool includes a hole cutting saw and an anchor that is driven into the workpiece in which a hole is to be cut. The reaction torque of the hole cutting operation is resisted by the anchor. In the preferred embodiment, the anchor is driven into the workpiece by pressing the tip of the anchor against the work to release a hammer that strikes the anchor and drives it into the workpiece. An electric motor in the tool resets the hammer for subsequent operation.

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to method of operating on work so there is little, if any, reaction of a tool element on a workman, and to a unique tool for practicing the method. Although the invention has particular utility under circumstances such as encountered in space travel, which make it undesirable and often impossible for workmen to exert forces necessary to accomplish such operations as cutting and drilling, its utility under normal gravity conditions to reduce operator fatigue and to accurately cut a hole without the need for center punching, is also appreciated.

More specifically, the invention relates to a method of performing a cutting operation on work wherein a torque is required to be applied to a cutter to accomplish cutting, the method providing for substantially zero torque reaction on the workman as a result of practicing the method. In addition, the invention relates to a unique tool arrangement for practicing the method. One phase of the invention includes a unique hole saw arrangement which eliminates the need for drilling a pilot hole in the work as is required with the commonly available hole saw.

The tool element employed to perform the cutting operation may be, for example, a drill, a fly cutter or a hole saw. Although the invention finds primary utility in the environment of a cutter driven with a rotary motion, it is to be understood that the invention works equally well with any tool or cutter which requires application of a torque thereto to effect the cutting operation. Common examples of the tool elements to which the invention is applicable are the usual cutters and tool elements commonly used with motor driven portable drills, as well as manually rotated "hand drills."

Though highly satisfactory tools are commonly available for use in the usual environments such as underearth gravity conditions and though the manner of using such tools is well known, neither the available tools nor the manner of operating same are practical when employed under circumstances of space travel where there is no resistance available to counteract reaction forces developed during operation of the tool. For example, the usual hand-held portable drill could not be used satisfactorily during travel in space because the substantially zero gravity conditions encountered in space travel render the human body freely movable, so that when attempting to operate the drill, one could not force the drill bit or hole cutter against the work without being pushed away from the work and could not resist the reaction torque resulting from the cutting action of the cutter while in engagement with the work, without first grasping a hand hold or other support on the spacecraft on which the work is to be performed. As a result of attempting to drill in outer space with the common portable drill, where no handhold or support is available, the workman would be pushed away from the spacecraft in attempting to force the drill bit against the work and would soon be rotated relative to the cutter even if he could force the drill bit against the work.

With the method and apparatus of this invention, the problems of the workman floating away from the work or rotating relative to the work during the cutting operation in which torque is used to drive the cutter, are completely overcome.

Under earth gravity conditions, a workman operating a portable drill equipped with a hole saw or other cutter, frequently experiences fatigue after an extended period of operation of the drill. In addition, it is usually necessary to centerpunch the work prior to each drilling operation in order to properly locate the center of the hole formed by the cutter. The frequently experienced fatigue is found to result from pressing the cutter against the work, as well as resisting the tendency of the portable drill housing to rotate as a result of cutter reaction. Such fatigue is minimized and frequently completely eliminated by the unique tool of this invention which is easily anchored to the work and, once anchored, exerts all the necessary forces to feed the cutter against the work.

Basically stated, the method of this invention includes providing a work engaging anchor for anchoring the tool to the work and counteracting against the anchor the torque reaction forces of the tool cutter on the work and the reaction forces resulting from forcing the tool cutter against the work. Since the anchor is fixed to the work and since the tool is connected to the anchor, these forces are ultimately counteracted or resisted by the work itself.

Simply stated, the apparatus of this invention for practicing the method includes an anchor that is part of the tool and is easily affixed to the work, a support or frame portion of the tool connected to the anchor, a drive mechanism carried by the support and a cutter driven by the drive mechanism. The apparatus provides the same advantages as the method in that all forces necessary to complete the cutting operation except that for initial engagement of the anchor with the work, are applied by the tool itself, and all reaction forces as a result of cutting are counteracted by the work via the connection between the work and the anchor. In addition, after the tool is anchored, when used during space travel, it provides a handhold to prevent the work from floating away from the spacecraft. Since requirements for the use of such tools are contemplated both during space travel and under earth gravity conditions, there is an active demand for a method of operating on a workpiece and for a driven tool which will produce zero reaction and near-zero reaction on the workman.

A general object of this invention is a method of operating on work in a manner substantially free from the usual reaction forces and a tool for practicing the method, which correspondingly satisfies the demand just described.

Another object is a method of low reaction cutting using a cutter which requires the application of a torque to effect the cutting operation and wherein none of the reaction forces from the cutting adversely affect a workman during space travel.

Another object is a unique tool for low reaction cutting having special utility in zero and near-zero gravity environments and wherein a cutting operation of the tool requires only initiation of the tool by the operator and thereafter, the tool proceeds automatically to complete the cutting operation.

A further object is a method of low reaction cutting wherein an anchor is fixed to the work to be cut and the anchor is automatically released at the completion of the cutting operation, and to a unique tool for practicing the method.

A still further object is a method of low reaction cutting in which an anchor is driven into the work to be cut, a cutter is moved in a path around the anchor so that the portion of the work pierced by the anchor is removed on completion of the cutting operation, and to a unique tool for accomplishing this method.

Another object is a mode of drilling and cutting, including a unique tool, which finds special utility in reducing and substantially eliminating fatigue of a workman performing drilling operations under earth gravity conditions.

Another object is a unique low reaction power tool including an anchor driven into the work, which automatically feeds a cutter against the work to effect a desired cutting operation without prior centerpunching or cutter feed by the workman operating the power tool.

Yet another object is a unique low reaction power tool including an anchor driven into the work, to resist torque and forces applied to a cutter to move the cutter against the work, and including a power driving device for the cutter which is also operable to preload a potential energy storage device used to drive the anchor into the work.

Another and further object is a method of operating a hole saw which eliminates the need for centerpunching and drilling a pilot hole for the saw, and a unique tool for practicing the method.

Another object is a method of hole cutting in which an anchor is driven into the work at the center of the hole to be cut, and a hole saw is rotated about the anchor to cut a circular plug from the work, the anchor functioning as a guide to accurately position the hole saw relative to the work and to permit movement of the saw in an axial direction relative to the anchor, and a hole saw arrangement which operates in accordance with the method.

In order that the manner in which the foregoing and other objects are achieved in accordance with the invention, can be understood in detail, a particularly advantageous embodiment thereof and modes of practicing the invention will be described with reference to the accompanying drawings which form a part of the specification and wherein.

Figure 1:
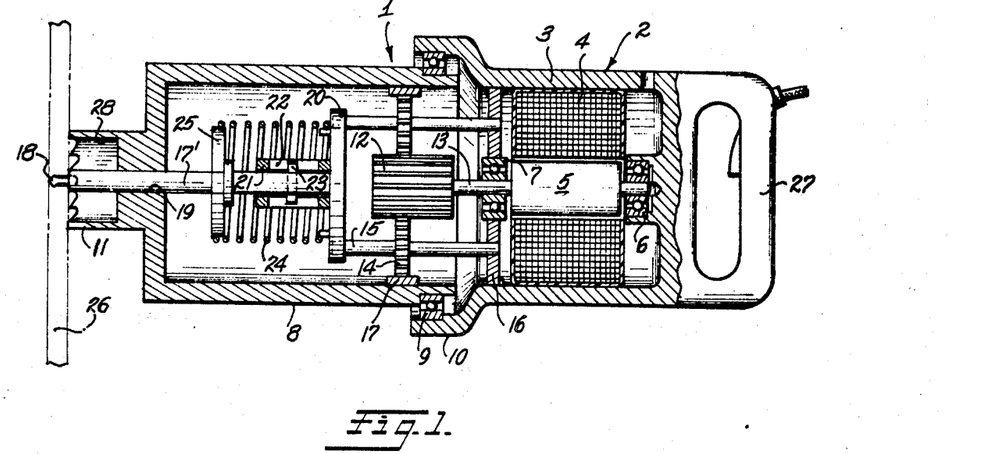
FIG. 1 is a plan view, partly in section, of a first embodiment of a portable power driven tool in accordance with this invention, the tool being shown in simplified form for purposes of explanation.

Referring to the drawings in detail and particularly to FIG. 1, there is shown a hand held, motor driven, portable tool 1, which operates in accordance with the method of this invention. Tool 1 is powered by a motor 2 having a housing 3 to which a stator 4 of the motor is fixed. A rotor 5 is disposed within stator 4 and journaled in suitable bearings 6 and 7 supported by housing 3. A barrel 8 is mounted for rotation on housing 3 by a bearing 9 at a flared end 10 of the housing, bearing 9 being of the type which resists axial thrust so that axial movement of the housing causes axial movement of the barrel. A tool element in the form of a hole cutter 11 is fixed on the end of barrel 8 remote from motor 2.

A spur type sun gear 12, fixed to shaft 13 of rotor 5 extends into the barrel. Spur type planet gears 14, which mesh with sun gear 12, are journaled on axles 15 fixed to an axle support plate 16 that is secured to the inside of housing 3. Planet gears 14 mesh with an internally toothed ring gear 17 fixed to the inside of the barrel. Since axles 15 are fixed to housing 3 via axle support plate 16, rotation of sun gear 12 causes rotation of planet gears 14 which in turn rotate barrel 8 but in a direction opposite to the direction of rotation of sun gear 12 and rotor 5.

A work engaging anchor 17′ in the form of an elongated member with a sharp piercing element 18 at one end, extends through an opening 19 of barrel 8 at its axis of rotation. Opening 19 functions as a bearing to permit rotation of barrel 8 around anchor 17′. Fixed to the ends of axles 15 which project into barrel 8 is an anchor support plate 20 having a sleeve 21 extending axially therefrom, the sleeve having a bore to receive the cylindrical shank of the anchor. The sleeve also has transverse slots 22 to accommodate a pin 23 extending transversely through the shank of the anchor. This connection between the sleeve 21 and anchor 17′ provides for limited axial movement of the anchor relative to the several parts of the tool and in addition, prevents rotation of motor housing 3 relative to the anchor. A tension spring 24 extends between a collar 25, fixed to the anchor, and plate 20. The tension of spring 24 exerts an axial force on anchor 17′ to the right (as viewed in FIG. 1) and correspondingly exerts an equal and opposite axial force to the left on anchor support plate 20, which force is transmitted to cutter 11 via housing 3, bearing 9 and barrel 8.

As shown at FIG. 1, piercing element 18 of anchor 17′ has already been driven into a workpiece 26. The driving of the anchor into the workpiece is accomplished by mechanism (not shown in FIG. 1 for purposes of simplicity) which will subsequently be described in detail with regard to the discussion of a preferred embodiment. With piercing element 18 of the anchor driven into the work, the anchor is fixed against both rotation and the axial force exerted by spring 24. Hence, the reaction of spring 24 functions to urge cutter 11 against workpiece 26. It is then only necessary to start motor 2 so that rotor 5 turns in a counterclockwise direction (looking toward the workpiece) to correspondingly rotate sun gear 12 counterclockwise, drive planet gears 14 clockwise, and thus rotate barrel 8 and cutter 11 in a clockwise direction to effect the cutting operation. Since motor housing 3 is fixed to anchor 17' against rotation, both the motor starting torque and reaction torque resulting from the cutting action of cutter 11 are resisted by anchor 17' via the connection of the anchor to motor housing 3. Since handle portion 27 is part of housing 3 of the motor, a workman operating tool 1 can use the handle as a handhold to maintain himself in a desired position relative to the tool when the tool is used during outer space travel. The disc-shaped portion of the workpiece severed by the cutter, after cutter 11 has cut through workpiece 26, includes the portion pierced by piercing element 18 and hence, anchor 17' is automatically disconnected from the work upon completion of the cutting operation. It will be noted with reference to FIG. 1 that as soon as the cutting operation is completed, spring 24 exerts a pull which causes the disc portion severed by the cutter to be pulled into the cylindrical recess 28 at the end of cutter 11. Since tool 1 is no longer fixed to the work when the cutter completes its cutting operation, the operator need merely catch the tool, if used under earth gravity conditions, or hold the tool to prevent same from floating away when used during space travel conditions.

Figure 3:
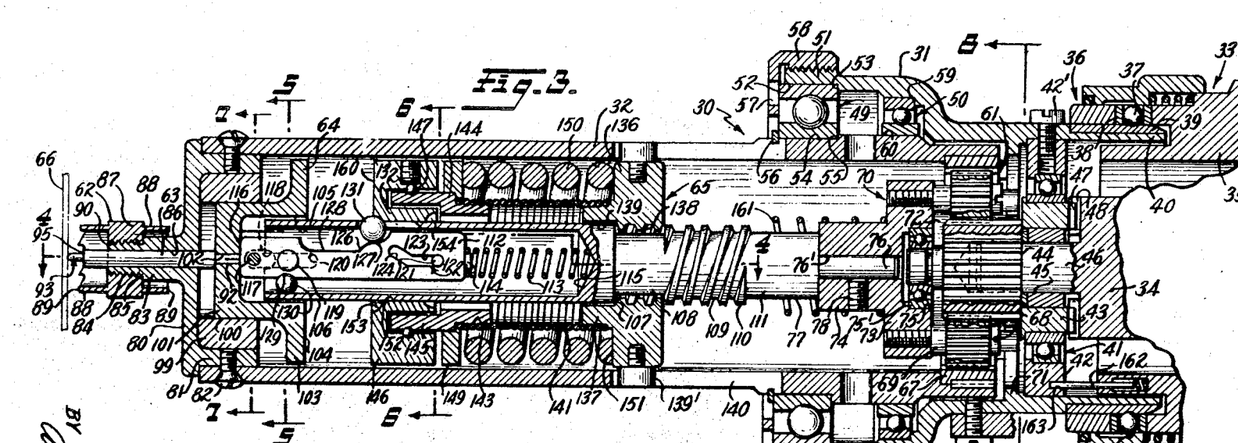
FIG. 3 is a plan view in section of another and preferred embodiment of the low reaction tool of this invention, with the parts thereof in position to drive an anchor into the work.
Figure 4:
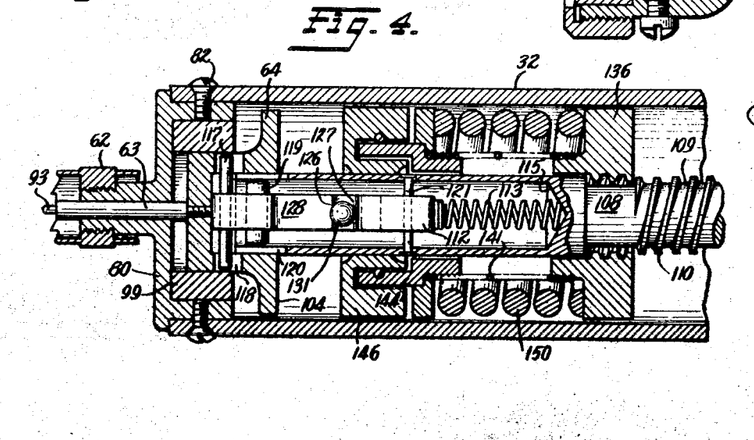
FIG. 4 is a partial longitudinal sectional view taken on line 4—4 of FIG. 3.

Now consider FIG. 3 which shows a preferred embodiment of a low reaction tool in accordance with this invention. Tool 30 includes a support in the form of a bell-shaped casing 31 and a barrel 32 mounted for rotation in casing 31. Tool 30 is adapted to be connected to a motor 33, having a shaft 34 driven by a rotor (not shown) and a housing 35 to which the stator of the motor is fixed. Motor housing 35 is removably secured to casing 31 by a connection 36 comprised of ball detents 37 on the motor housing which are cammed into an annular recess 38 formed in a sleeve 39 fixed to the reduced diameter outer end 40 of casing 31. A sliding sleeve 40' is provided with a cam face 41' to maintain ball detents 37 in recess 38. The outer end of sleeve 39 is beveled to facilitate aligning motor housing 35 with the casing 31.

The outer stationary race of ball bearing 41 seats in a bearing retaining ring 42 secured to casing 31 by a screw 42' at a location spaced axially from the outer end 40 of the casing. Mounted on the inner rotatable race of bearing 41 is a drive bushing 43 having press fitted therein a reduced diameter end of a spur type sun gear 44. Sun gear 44 is provided with an axially projecting bore 45 to receive a reduced diameter cylindrical pilot 46 at the end of shaft 34. Projecting axially from bushing 43 in a direction away from sun gear 44 are circumferentially spaced teeth 47. Teeth 47 mesh with cooperating axially projecting teeth 48 on a transverse annular shoulder between shaft 34 and pilot 46 of the shaft. Pilot 46 and teeth 47 and 48 cooperate to provide a self-aligning driving connection between shaft 34 and sun gear 14. Because of the arrangement of ball detents 37 and depressions 38 of sleeve 39, the connection between motor 33 and casing 31 is a self-locking removable snap type connection which requires merely positioning the motor in general alignment with the casing, moving the two together, and releasing sleeve 40' to cam ball detents 37 into recess 38.

Barrel 32 is mounted for rotation in casing 31 by bearings 49 and 50. Bearings 49 and 50 are mounted in the annulus between a flared end 51 of the casing and the outer surface of barrel 32. The outer race of bearing 49 is a slip fit in cylindrical opening 52 of casing 31, cylindrical opening 52 terminating at a short transverse, inwardly extending annular shoulder 53 against which the stationary race abuts. The inner race of bearing 49 slips on cylindrical surface 54 of the barrel, cylindrical surface 54 terminating at outwardly projecting transverse shoulder 55 against which the inner race abuts. Bearing 49 is held against axial movement relative to barrel 32 by a snap ring 56 disposed in a groove in the barrel spaced from shoulder 53 a distance sufficient to accommodate the inner race of bearing 49. The outer race of bearing 49 is held against shoulder 53 by the inwardly extending flange portion 57 of a ring 58 threaded onto flared end 51 of the casing.

Spaced axially from bearing 49 is bearing 50. The outer race of bearing 50 seats against a transverse annular shoulder 59 in the casing and the inner face seats against outwardly extending shoulder 60 of barrel 32. Bearings 49 and 50 assure axial alignment between casing 35 and barrel 32 and provide for separation of the casing from the barrel by merely unthreading ring 58 and sliding the barrel out of the casing.

In addition to the connection between casing 31 and barrel 32 which mounts the barrel for rotation relative to the casing, tool 30 includes a drive gear assembly 61, adjacent the end of barrel 32 which extends into the casing 31, a hole cutter 62 in the form of a hole saw mounted on the opposite end of the barrel, an anchor 63 in the form of an elongated pin which extends through the hole cutter 62, an anchor holder 64 within barrel 32, and mechanism 65 within barrel 32 which is operable to drive anchor 63 into the work and to apply a pull on the anchor which urges hole cutter 62 against the work.

Drive gear assembly 61 includes the sun gear 44 previously described. Fixed to the inside of barrel 32 at the end of the barrel adjacent motor shaft 34 is an internally toothed ring gear 67 which is transversely aligned with sun gear 14. Two spur type planet gears 68 are located between ring gear 67 and sun gear 44 and mesh with each of these gears. Planet gears 68 are mounted for rotation on parallel axles 69 which extend through the space between sun gear 44 and the ring gear 67. Axles 69 take the form of threaded studs which are screwed into threaded openings in a planet gear carrier 70. Planet gear carrier 70 originates at a web 71 integral with casing 31 and which extends radially inwardly at a location between bearing 41 and ring gear 67. Integral with web 71 is a hollow cylindrical wall 72 which extends through the annulus between ring gear 67 and sun gear 44 to terminate at a transversely extending body portion 73 which has an axially projecting cylindrical end 74. Cylindrical wall 72 is cut away as at 73' and 74' (FIG. 8) to accommodate planet gears 68 and sun gears 44 therein. End 74 is counterbored at 75 to receive the outer race of a ball bearing 75' on a pilot end of sun gear 44. Hence, sun gear 44 is supported at one end by bearing 75' and at the other end by bearing 41. Since axles 69 are fixed to planet gear carrier 70 which is integral with casing 31, the planet gears only rotate and do not revolve about the sun gear, and hence, barrel 32 is rotated in a direction opposite to the direction of rotation of sun gear 44 by the drive arrangement provided by sun gear 44, planet gears 68 and ring gear 67.

Barrel 32 takes the form of an elongated thin wall sleeve. Mounted on the end of the barrel adjacent cutter 62 is a tool holder 80. Tool holder 80 has a skirt 81 which extends axially into barrel 32, and is fixed to the barrel by screws 82 threaded therein. Projecting from tool holder 80 is a shank 83 with a reduced diameter threaded tip 84 that terminates at a transverse annular shoulder 85 which faces toward work 66. Shank 83 is provided with a bore 86 which extends therethrough to receive anchor 63. The arrangements is such that the axis of bore 86 lies along the axis of rotation of barrel 32 and is also aligned with the axis of rotation of sun gear 44 and shaft 34.

Cutter 62 is seen to have a central portion 87 which has projecting axially from each end thereof a sleeve portion 88 provided with cutter teeth 89. Body portion 87 is provided with internal threads 90 which cooperate with the threads on threaded tip 84 to permit threading the cutter onto the tip into abutting engagement with shoulder 85. When body 87 engages shoulder 85 further, motion of cutter 62 relative to the tool holder 80 is prevented, and hence, rotation of barrel 32 causes rotation of tool holder 80 with corresponding rotation of cutter 62. By virtue of the double sleeve arrangement wherein two sets of cutter teeth 89 are provided, hole cutter 62 is reversible so that when one set of teeth becomes dull, the cutter can be reversed to utilize the second set of teeth.

Figures 5, 6, 7, 8, 9, 10, 11:
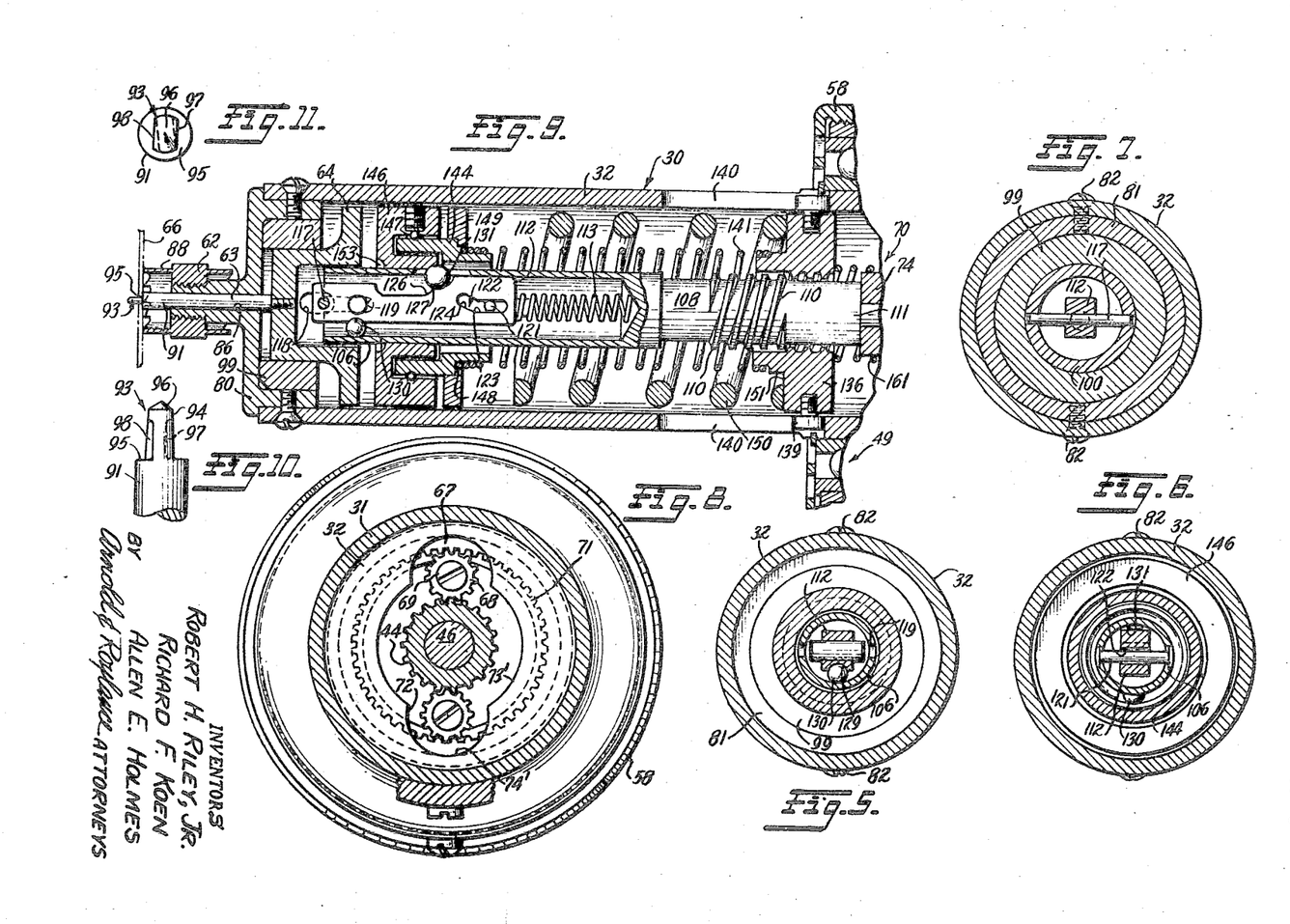
FIG. 5 is a transverse sectional view taken on line 5—5 of FIG. 3.
FIG. 6 is a transverse sectional view taken on line 6—6 of FIG. 3.
FIG. 7 is a transverse sectional view taken on line 7—7 of FIG. 3.
FIG. 8 is a transverse sectional view taken on line 8—8 of FIG. 3.
FIG. 9 is a view corresponding to that of FIG. 3 with the several elements of the tool in the position they occupy during the cutting operation.
FIG. 10 is an enlarged partial view of the work-engaging anchor of this invention.
FIG. 11 is an end view of the work-piercing element of FIG. 10.

As shown in FIGS. 3, 10 and 11, anchor 63 is elongated and has a cylindrical body portion 91 with a reduced diameter threaded tip 92 at one end, and a piercing element 93 projecting axially from its other end. Piercing element 93 has a reduced diameter tapered shank 94 which joins with body 91 at a transverse annular shoulder 95 which faces toward work 66. Head 96 of piercing element 93 has a sharp conical tip. Shank 44 is undercut as at 97 and 98 to provide angled undercut flutes which bite into the material in which the piercing element 93 is imbedded to resist both torque and axial pull on anchor 63. Shoulder 95 presents a stop face to limit the depth of penetration of piercing element 93 into work 66.

Fixed within skirt 81 of tool holder 80 by screws 82 is a sleeve bearing 99. Anchor holder 64 has a cylindrical portion 100 dimensioned to slide in bearing 99 and to permit rotation of the bearing relative to the anchor holder, during rotation of barrel 32. Head 101 of the anchor holder is provided with an axial bore which has lefthand threads that cooperate with lefthand threads at threaded tip 92 of anchor 63. Lefthand threads are provided to prevent unthreading of the anchor as a result of clockwise rotation of barrel 32 after the anchor is pierced into the work. At the other end of cylindrical portion 100, is an outwardly projecting flange 103 which presents a flat transverse annular striking surface 104 that faces in a direction away from piercing element 93. Cylindrical portion 100 is machined to provide a cylindrical opening 105.

Support shaft 77 includes an elongated hollow sleeve 106 of a length approximately half the length of barrel 32. Sleeve 106 merges with shaft 77 at a shoulder 107 between a smooth portion 108 of shaft 77 and a portion 109 provided with lefthand threads 110. Threads 110 terminate short of tip 76 to provide a smooth portion 111 of shaft 77 between the righthand end of threads 110 and end 74 of planet gear carrier 70.

Sleeve 106 extends partly into opening 105 and is dimensioned to slide relative to anchor holder 64. Within the bore of sleeve 106 is a latch release member 112 which is urged toward anchor 64 by a helical compression spring 113 which encircles a cylindrical spring retaining tip 114 of the latch member at one end and engages end face 115 of the sleeve bore at its other end. In the position shown in FIG. 3, forward end 116 of latch member 112 engages the underside of head 101 of anchor holder 64.

Latch member 112 is connected to anchor holder 64 for limited axial movement relative to the anchor holder, but against rotation. This connection is effected by a pin 117 which extends through the body of latch member 113 adjacent forward end 116. The ends of pin 117 ride in diametrically opposed elongated slots 118 formed in cylindrical portion 100 to anchor holder 64. Slots 118 have a width somewhat greater than the diameter of pin 117 for a purpose which will subsequently be described in detail. Latch member 112 is maintained in a central position transversely of sleeve 106 by a roll 119 which extends through latch member 112, and has a length slightly less than the diameter of the sleeve. The roll pin 119 has a diameter greater than the width of slots 120 of sleeve 106 so that the ends of the pin engage the inside of sleeve 106 to resist transverse movement of latch member 112. Slots 120 are open at the forward end of sleeve 106 and function to receive pin 117 when the latch member is moved axially further into sleeve 106 as shown at FIG. 9.

Latch member 112 is connected to sleeve 106 against rotation by a pin 121 which extends transversely through the sleeve 106 at a location spaced only slightly from tip 114, pin 121 extending through a slot 122 in latch member 112. It will be observed with reference to FIG. 3 that pins 117, 119 and 121 are parallel with each other and pass through the longitudinal axis of tool 30. Slot 122 is dimensioned to receive pin 121 for sliding movement of latch member 112 relative to the pin. Slot 122 has a first portion 123, the sides of which are parallel with each other and equally spaced on opposite sides of the axis of the tool and a second portion 124 which merges with the first portion but is inclined at an angle to the first portion.

Figure 12:
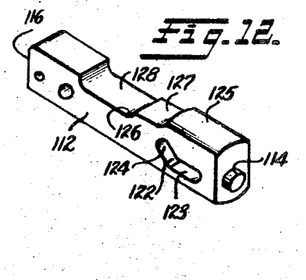
FIG. 12 is a view in perspective of a portion of the anchor latch mechanism.

With reference to FIG. 12, it is apparent that latch member 112 is elongated and is generally rectangular as viewed in elevation and transverse section. The side face 125 of latch member 112 toward which portion 124 of slot 122 projects, is provided with a stepped recess which provides cam faces 126 and 127. Cam face 126 is steeply inclined and merges with a face 128 which is essentially parallel with side 125. On the opposite side of latch member 112 is a spherical depression 129 which provides a seat for a ball 130. Depression 129 and ball lie in a radial plane passing through the axis of roll pin 119.

With the parts of the tool in the position of FIG. 3, a ball rests on cam face 127 and is urged radially outwardly into an elongated slot 132 formed in sleeve 106. Slot 132 has a transverse dimension which is slightly less than the diameter of detent ball 131 to prevent the detent ball from being pushed through the slot by the action of the cam faces of latch member 112 and the sides of slot 132 diverge toward the axis of sleeve 106. The recess defined by the cam faces and side 128 of the latch member is so dimensioned relative to the ball, that ball 131 always has a portion thereof projecting into slot 132 whenever the latch member is in the position shown at FIG. 3. This dimensional relationship provides for maintaining the ball in the slot.

Mechanism 65 is provided to both drive anchor 63 into the workpiece and to exert an axial pull on the anchor after the anchor is driven into the work. This mechanism includes nut member 136 with a sleeve portion 137 that projects toward the cutter end of the tool. The main portion of the nut member is provided with internal threads 138, the inside of the sleeve portion being unthreaded to provide a smooth bore 138 which encircles the end of sleeve 106 when the parts occupy the position of FIG. 3. The axial length of threads 138 is slightly less than the length of portion 108 of shaft 77 to permit the nut to occupy a position as shown in which the nut is run completely off threads 110 in a direction toward the cutter end of the tool. Nut member 136 is keyed to barrel 32 for rotation with the barrel by diametrically opposed screws 139 threaded into the nut member at opposite sides thereof. The heads of screws 139' provide a smooth cylindrical surface to ride in elongated diametrically opposite slots 140 which extend completely through barrel 32. Slots 140 originate at a point spaced from one end of threads 110 of shaft 77 and terminate at a point spaced from the other end of threads 110, the slots being sufficiently long and being so dimensioned that nut member 136 runs off threads 110 at the end of its travel to the position of FIG. 3, and also at the end of its travel to the position of FIG. 9.

The outer periphery of sleeve portion 137 of nut member 136 is provided with threads to permit threading a helical tension spring 141 onto the nut member against movement axially thereof. The other end of spring 141 is similarly threaded onto a threaded portion 143 of a sleeve 144, which is spaced axially from nut member 136 along shaft 77. Sleeve 144 includes a hollow cylindrical end 145 which projects into a hammer member 146. Cylindrical portion 145 of the sleeve is mounted in the hammer member for rotation but against axial movement relative to the hammer member by a ball bearing 147. Between threaded portion 143 and cylindrical portion 145 is a transverse annular shoulder 148 which faces toward nut member 136. A washer 149 with a stepped bore encircles cylindrical portion 145 and has an annular end face which abutse shoulder 148. Washer 149 provides a seat for one end of a helically wound compression spring 150. The other end of compression spring 150 seats on a flat transverse face 151 of nut member 136. The ends of spring 150 are ground flat so that spring 150 seats squarely on a washer 149 and face 151.

Hammer member 146 has a bore 152 of sufficient diameter to permit the hammer member to slide freely on sleeve 106. At the end of bore 152, the bore is chamfered to provide arcuate ball seats 153 and 154 at opposite ends of bore 152.

A brief review of the primary features of the preferred embodiment of FIGS. 3–9 and 12 will now be made to facilitate understanding the operation of this embodiment. It will be observed with reference to FIG. 3 that barrel 32 is elongated and is mounted at one end for rotation on casing 31 by bearings 49 and 50, each of which is a thrust bearing to prevent movement of the barrel axially of casing 31. With anchor 63 driven into the work 66 the cutter end of barrel 32 rotates with sleeve bearing 99 about the cylindrical portion 100 of anchor holder 64. Hence, bearings at each end of barrel 32 support same for rotation.

Support shaft 77 is fixed to planet gear carrier 70 by screw 78 which firmly engages tip 76 of the support shaft. Since planet gear carrier 70 is integral with casing 31, support shaft 77 is fixed to casing 31 against both axial movement and rotation. Latch member 112 is connected against rotation to sleeve 106 of support shaft 77 by pin 121 extending through the wall of sleeve 106 and slot 122 of the latch member. However, this connection provides for limited movement of the latch member axially of sleeve 106. Pin 117 which extends into slots 118 of anchor holder 64 prevents rotation of the anchor holder relative to latch member 112 and also provides for limited axial movement of the latch member relative to the anchor holder. Left hand threads on tip 92 of anchor 63 and bore 102 of anchor holder 64 prevent unthreading the anchor when barrel 32 is rotated clockwise (looking toward work 66), since reaction torque of the cutter is in a counter-clockwise direction. The threaded connection between anchor holder 64 and anchor 63 transmits axial forces.

Barrel 32 rotates about an axis at its longitudinal center. Anchor 63, achor holder 64, shaft 77, body 73 of planet gear carrier 70, sun gear 44, and motor drive shaft 34 are concentric with barrel 32 and extend along the axis of rotation of the barrel. Hammer member 146, nut member 136, and springs 141 and 150 are also concentric with barrel 32 and located therein. Nut member 136 rotates with barrel 32 because of the engagement of the heads of screws 139 with slots 140 of the barrel.

OPERATION

FIG. 3 shows tool 30 with the parts thereof in operative position to drive piercing element 93 of anchor 63 into work 66. Observe that nut member 136 has run off the left end of threads 110 and that hammer member 146 is held against axial movement by ball 131. In this position of the hammer member and nut member, compression spring 150 is compressed between face 151 of the nut member, and washer 149. Compression spring 150 has a high spring rate so that substantial potential energy is stored in the spring when compressed as shown in FIG. 3. Annular ball seat 153 of hammer member 146 exerts a component of force radially inwardly on ball 131. The inward component of force is resisted by the engagement of ball 131 with cam face 127 of latch member 112. Cam face 127 and spring 113 are so selected that the force of spring 113 is greater than the component of force from ball 131 tending to move latch member 112 into sleeve 106. Movement of latch member 112 transversely away from slot 132 is prevented by pin 121 and ball 130. In addition, spring 150 exerts a substantial axial force against hammer member 146 which is resisted by engagement of ball 131 with the forward end of the slot 132 of sleeve 106. Hence, so long as latch member 112 remains in the FIG. 3 position, ball 131 prevents movement of hammer member 146 by spring 150. Forward annular face 160 of hammer member 146 is smooth and flat and of approximately the same diameter as face 104 of anchor holder 64. To release hammer member 146 to drive piercing element 93 into work 66, the operator of the tool first positions the tip of piercing element 93 at the center of the hole to be cut in the workpiece and then forces tool 30 toward the workpiece. The force causes anchor 63 to move to the right which correspondingly moves anchor holder 64 into engagement with end face 116 of latch member 112. Latch member 112 then moves to the right as the force applied to tool 30 overcomes spring 113. Hence, the effect of forcing anchor 63 against the work is to slide latch member 112 axially into sleeve 106. In addition to the force of spring 113, there is also a slight frictional force between ball 131 and cam face 127 which resists motion of the latch member 112 into the sleeve. As latch member 112 moves to the right, ball 131 moves onto cam face 126. Cam face 126 is sufficiently steep that ball 131 is forced against side 128 of the latch member by the hammer member as soon as the ball leaves cam face 127. Thus, hammer member 146 is released and is driven against face 104 of anchor holder 64 by the energy of compression spring 150. The blow on face 104 of the anchor holder drives or punches piercing element 93 into work 66. The depth of penetration of piercing element 93 is limited by shoulder 95 of the anchor which engages the surface of work 66 as shown at FIG. 9. As soon as annular ball seat 154 of the hammer member passes the fordward end of slot 132 of sleeve 106, ball 131 is again forced outwardly into slot 132 by the action of cam faces 126 and 127, as latch member 112 is moved toward the cutter end of the tool by spring 113. Spring 150 is so selected that after hammer member 146 strikes face 104 of the anchor holder the spring is still slightly compressed. This slight compression of spring 150 maintains the hammer member in engagement with the anchor holder and also forces nut member 136 toward threads 110 so the threads 138 of the nut member can catch on threads 110.

After anchor 63 is driven into work 66, motor 33 is started to rotate barrel 32 in a clockwise direction (looking toward work 66). Clockwise rotation of barrel 32 causes rotation of nut member 136 in a clockwise direction and similarly rotates sleeve 144 relative to hammer 146 via spring 141. Such rotation of nut member 136 causes the nut to travel along threads 110 gradually increasing the tension in spring 141 until the nut reaches portion 111 of shaft 77 whereupon nut 136 runs off the righthand end of threads 110. As nut member 136 moves to the right, spring 141 pulls hammer 146 to the right until annular ball seat 154 engages ball 131. The force of spring 141 is transmitted from the hammer member to the ball to exert a pull to the right on latch member 112. The pull exerted by spring 141 when fully tensioned is substantially greater than the force of compression spring 113, and hence, latch member 112 moves to the right to the position of FIG. 9. The pull on latch member 112 is transmitted to anchor holder 64 by pin 117 because of its engagement with slots 118 of the anchor holder. Since anchor 63 is fixed to the anchor holder, the force of spring 141 exerts a pull on the anchor. However, the anchor when driven into the work, is fixed against both rotation and axial movement. Hence, the movement which occurs as a result of the tension of spring 141 is movement of barrel 32 in a direction toward work 66. Such movement occurs because spring 141 also exerts a pull to the left on nut 136 which is transmitted to shaft 77 by engagement of the nut member with the end of threads 110. The pull is transmitted from shaft 77 to casing 31 by planet gear carrier 70. Bearings 49 and 50 transmit the force from casing 31 to barrel 32. Since cutter 62 is fixed to cutter holder 80 which in turn is fixed to the barrel, the cutter is urged against the work by spring 141. Continued rotation of the barrel 32 in a clockwise direction causes the cutter to cut through the work without the need for an external axial force as is usually exerted by a workman using a drilling tool. Although continued rotation of barrel 32 in a clockwise direction continues to drive nut member 136, the nut member is free to rotate, since its threaded portion now lies on the smooth portion 111 of shaft 77.

Shaft 77 is prevented from rotating by anchor 63 by virtue of the following. Since anchor holder 64 is fixed to anchor 63, the anchor holder does not rotate. Latch member 112 cannot rotate relative to anchor hollder 64 by virtue of the engagement of pin 117 of the latch member with slots 118 of the anchor holder. Sleeve 106 is prevented from rotating relative to anchor holder 64 and latch member 112 by pin 121, which extends transversely through the sleeve and the slot 122 of the latch member. Since shaft 77 is an integral part of sleeve 106, neither shaft 77 nor planet gear carrier 70 rotate relative to the anchor. Similarly, planet gear carrier 70 is integral with casing 31, and thus casing 31 cannot rotate relative to the anchor. The connection between motor housing 35 and casing 31 includes a spring urged pin 162 carried by the casing and an opening 163 in bearing holder 42 into which the pin extends to prevent rotation of the motor housing relative to the casing. The motor housing is therefore also prevented from rotating relative to the anchor. With anchor 63 driven into the work, the all reaction torque from the cutter as well as starting torque of the motor is ultimately resisted by the work itself.

Sleeve portion 88 of hole cutter 62 encircles the portion of the work into which anchor 63 is driven. The work is a relatively thin sheet of metal and cutter 62 cuts a disc of circular outline from the sheet. The disc severed by the cutter includes the portion of the work into which the anchor is driven. When cutter 62 cuts completely through the work the anchor is in effect released. Upon release of the anchor the tension force of spring 141 is resisted only by compression spring 113. However, this compression spring is substantially weaker than tension spring 141 and hence, the force of the spring on ball 131 via hammer member 146 urges latch member 112 to the right. As latch member 112 moves to the right, pin 121 enters the angled portion 124 of slot 122 and latch member 12 begins to pivot in a clockwise direction about ball 130. Continued movement of latch member 112 to the right causes further clockwise pivotal movement of the latch member until a position is reached where ball 131 on cam face 127 is radially inwardly of the surface of bore 152 of hammer member 146. The hammer member is then released and is pulled by the tension spring to a position in which annular ball seat 153 of the hammer member is to the right of ball 131. As soon as ball 131 is disengaged from hammer member 146, the force of tension spring 147 no longer acts on latch member 112. Hence, compression spring 113 then moves the latch member to the left so that pin 121 rides back in to portion 123 of slot 122 to again position ball 131 in slot 132. It is to be noted with particularity that ball 131 never leaves cam face 127 during the entire time when tension spring 141 exerts a pull on the latch member 112 via ball 131.

After cutter 62 severs a disc from the work, but before hammer member 146 is released, the disc is pulled into sleeve portion 88 of the cutter by anchor 63. After the work piece is severed, motor 33 is turned off. The motor is then turned on to rotate in a reverse direction so that barrel 32 turns counterclockwise. Such counterclockwise rotation of the barrel serves to unthread anchor 63 from anchor holder 64 (as previously mentioned the anchor and anchor holder are left-hand threaded) because of the frictional engagement of the disc severed from the work with the inner surface of sleeve portion 88 of cutter 62. A new anchor may then be threaded into the anchor holder, whereupon drilling may be resumed. The effect of reverse rotation of barrel 32 is to again preload spring 150 as well as to unthread the anchor from the anchor holder. Observe with regard to FIG. 9 that compression spring 150 urges nut member 136 toward the right hand end of threads 110. Keeping in mind that after the drilling operation is completed, the hammer 146 and latch member 112 occupy the positions of FIG. 3, counterclockwise rotation of barrel 32 runs nut member 136 in a direction to the left on shaft 77. When nut member 136 reaches the position of FIG. 3 relative to shaft 77, the nut member runs off the threads so that continued rotation of the barrel cannot jam or otherwise damage either threads 110 or nut member 136. With spring 150 again compressed, another drilling operation can be accomplished by pushing the point of piercing element 93 against the surface of the work to initiate release of hammer member 146 to drive the anchor into the work as previously described. If drilling is not to be resumed immediately barrel 32 may be run in a clockwise direction to unload compression spring 150.

Figure 2:
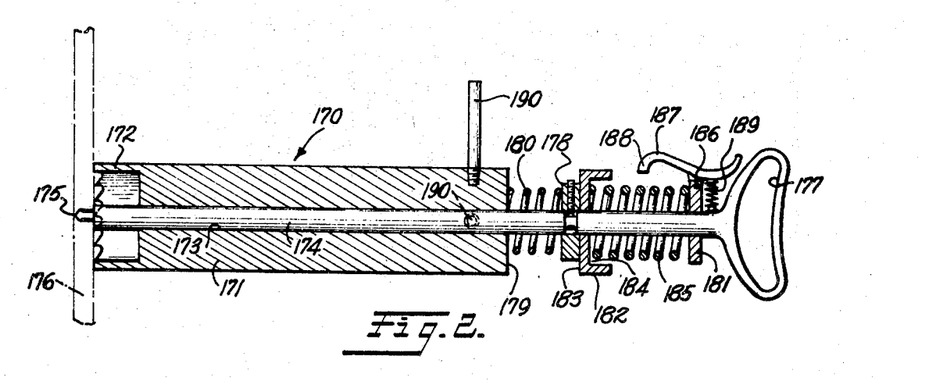
FIG. 2 is a plan view in partial section of a manually powered tool in accordance with this invention.

Now consider the manually operated version of the tool of this invention as shown at FIG. 2. Here, there is shown a manually operated low reaction tool 170 having a barrel 171 with a hole saw-type cutter 172 at one end thereof. Extending through central bore 173 of barrel 171 is the shaft portion of an anchor 174. As shown, piercing elements 175 of anchor 174 is already driven into work 176. Piercing element 175 is fixed to anchor 174, the piercing element being of the type previously described which resists torque and axial pull when driven into the work. At its opposite end, anchor 174 is provided with a handle 177 for grasping by a workman using the tool. A collar 178 is keyed to anchor 174 at a location axially spaced from end face 179 of the barrel. A compression spring 180 is disposed between end face 179 and collar 178. Fixed to anchor 174 at a location adjacent handle 177 is a bushing 181. Slidably mounted on the anchor between collar 178 and bushing 181 is a hammer member 182. The opposite faces of hammer member 182 are essentially flat to provide a striking face 183 at one side and a seat 184 at the other side for a strong compression spring 185 the opposite end of which seats on bushing 181. Pivotally mounted on bushing 181 as by a pin 186 is a latch member 187 with a latch tip 188 that is normally urged inwardly by a compression spring 189. Fixed to barrel 171 are several radially projecting bars 190. In operation, hammer member 183 is pulled manually toward bushing 181 until tip 188 of latch member 187 extends in front of face 183 of the hammer member. Piercing element 175 of anchor 174 is then positioned against work 176 and an axial force is applied to handle 177 to hold the piercing element against the surface of the work. Latch 187 is then manipulated to release hammer member 182 which is snapped forward under the action of spring 185 into engagement with collar 178. This impact force is transmitted by collar 178 to the anchor element 175 into work 176. The anchor holds handle 177 against axial movement and also against rotation. By simultaneously grasping handle 177 and bar 190, a workman can rotate barrel 171 while resisting the torque forces necessary to rotate the barrel. The compression spring 180 urges cutter 172 against the work by virtue of engagement of the spring with end face 179 of the barrel and the end face of collar 178. Therefore, the axial force necessary to move the cutter against the work is also resisted by the anchor. Hence, even in the manually rotated version of the tool of this invention, the reaction forces as the result of torque necessary to rotate the cutter as well as the reaction forces of the cutter as it bites into the work are reacted by the anchor which is driven into the workpiece.

Observe, with regard to the embodiments of FIGS. 2 and 3–12, that a significant feature of the invention is to provide a hand hold for an operator using the tool, during space travel, so that the operator can maintain his position relative to the tool and workpiece as soon as the anchor is pierced into the workpiece. When used during travel in outer space, the initial push of the operator on the tool to release the anchor driving hammer will tend to push the operator away from the work. However, by exerting a short quick push, the hammer member will be reelased and the anchor driven into the workpiece before such floating of the workman becomes significant. As soon as the anchor is driven into the work, the workman can pull himself back toward the work, and proceed with the cutting operation.

A significant feature of the tool of this invention is its ability to cut a hole in sheet material without the need for center punching and drilling a pilot hole as is required with presently available hole cutters such as the common hole saw. This feature, of course, has utility under normal gravity conditions to simplify hole cutting operations. Since the cutter, in all the embodiments shown and described moves axially relative to the anchor and since the anchor serves as a guide or pilot to accurately position the cutter relative to the work, precise locating of the cutter is accomplished without prior center punching or pilot drilling the work. Under earth gravity conditions this feature alone is of exceptional utility even without the self-feeding action of the tension spring which exerts a pull on the anchor and torque resisting arrangement which counteracts cutter reaction torque. However, it is to be appreciated that the self feeding and torque counteracting arrangement substantially reduce operator fatigue during extensive drilling operations.

Although preferred embodiments of a tool and methods of cutting using the tool have been shown and described with regard to cutting a hole in a metal sheet it is to be understood that numerous changes can be made in the tool and its mode of operation, and that the tool may be advantageously used to cut various forms and types of materials without departing from the scope of this invention as defined in the appended claims.

What is claimed is:

1. A low reaction tool comprising, in combination,
  a support;
  tool element mounting means on said support for mounting a tool element for movement about an axis;
  tool drive means carried by said support and operatively coupled to said tool element mounting means to turn a tool element about said axis;
  a work piercing element carried by said support;
  piercing element drive means on said support to punch said work piercing element into the work;
  manually operable means on said support to actuate said piercing element drive means to punch said work piercing element into the work independently of the operation of said tool drive means to enable punching the piercing element into the work prior to actuation of the tool drive means;
  torque resisting means connected between said support and said work piercing means,
whereby reaction torque of a tool element operating on the work is resisted by the work itself.

2. A low reaction tool according to claim 1 wherein said drive means carried by said support is a motor having
  a first portion connected to said support against rotation relative to the support, and
  a second portion carried by said first portion and mounted for rotation relative to said support.

3. A cutting tool comprising, in combination
  a barrel rotatable about an axis;
  a support shaft in said barrel and concentric therewith, said support shaft having an axially threaded portion;
  means mounting said barrel for rotation relative to said support;
  means mounting said barrel against movement axially of said support shaft;
  a hole cutter fixed to said barrel adjacent an end thereof;
  a piercing element holder within said barrel and movable axially of said support shaft and said barrel, said holder including a transversely extending impack receiving face;
  hammer means between said barrel and said shaft and slidable axially of said shaft, said hammer means being engageable with said impact receiving face of said piercing element holder;
  a nut member on the side of said hammer remote from said piercing element holder, said nut member having internal threads and being threaded onto said thread portion of said support shaft whereby, rotation of said nut member in a predetermined direction moves same toward said hammer means,
  a compression spring between said hammer and said bushing;
  means connecting said bushing to said barrel for rotation therewith whereby rotation of said barrel in said predetermined direction moves said bushng to compress said spring;
  latch means within said barrel and in the path of travel of said hammer means to retain said hammer means against movement toward said piercing element holder;
  latch release means operatively associated with said latch means to selectively release said hammer, and
  a piercing element fixed to said piercing element holder and extending through said cutter along said axis;
whereby, said piercing element is driven into the work upon operation of said latch release means.

4. A cutting tool according to claim 3 which further includes
  second spring means, said second spring means being connected between said nut member and said piercing element holder;
  rotation of said barrel in a direction opposite to said predetermined direction serving to move said nut member away from said piercing element holder to tension said spring to exert a pull on said piercing element;
whereby said cutter is urged toward the work, into which said piercing element is driven, by said second spring.

5. A cutting tool according to claim 3 which further includes
  means connecting said piercing element holder to said support shaft against rotation;
whereby reaction forces of said cutter are resisted by said piercing element.

6. A hole cutting tool comprising
  a support;
  a hole cutter rotatable about an axis;
  a work piercing element carried by said support for movement along said axis;
  means mounting said hole cutter on said support for rotation about said axis and for axial movement relative to said piercing element;
  means on said support to drive said work piercing element into the work to be cut by said cutter, said means including a spring;
  means to load said spring;
  latch means to release said spring; and
  bearing means cooperating with said piercing element and said cutter to guide said cutter relative to said piercing element.

7. A hole cutting tool comprising
support means;
a hole cutter;
a linearly movable work piercing anchor element carried by said support means and extending along said axis;
means mounting said hole cutter on said support means for rotation about said axis and for axial movement relative to said piercing element;
means on said support means to punch said anchor element into the work,
said means including a potential energy source carried by said support means;
said anchor element being adapted to anchor itself to the work when punched into the work;
means coupling said anchor element to said support against relative rotation, whereby reaction torque from said hole cutter is resisted by said anchor element;
bearing means cooperating with said piercing element and said cutter to guide said cutter relative to said piercing element;
means connected between said cutter and said anchor and exerting a pull on said anchor to feed said cutter against the work;
power means to rotate said cutter.

8. A cutting tool comprising in combination
a support;
a barrel mounted for rotation on said support about an axis;
a work piercing element extending along said axis and having a portion thereof within said barrel;
piercing element holding means in said barrel mounting said work piercing element for movement along said axis;
hammer means in said barrel engageable with said piercing element holding means to drive said piercing element into the work;
means carried by said support to drive said hammer means;
power means connected between said barrel and said support to rotate said barrel about said axis and comprising
an electric motor having a stator and a rotor mounted for rotation within said stator;
a hole cutter secured to said barrel for rotation therewith about said axis;
bearing means between said hole cutter and said piercing element to guide said hole cutter relative to the work; and
gear means connected between said rotor and said barrel to rotate said barrel upon rotation of said rotor, said gear means comprising
a sun gear fixed to said rotor,
a ring gear having an internal driving face fixed to said barrel, and
planet gears between said sun gear and ring gear and in driving engagement therewith.

9. A cutting tool comprising in combination
a support;
a barrel mounted for rotation on said support about an axis;
a work piercing element extending along said axis and having a portion thereof within said barrel;
piercing element holding means in said barrel mounting said work piercing element for movement along said axis;
hammer means in said barrel engageable with said piercing element holding means to drive said piercing element into the work;
means carried by said support to drive said hammer means and including
a spring engageable with said hammer means;
power means connected between said barrel and said support to rotate said barrel about said axis;
a hole cutter secured to said barrel for rotation therewith about said axis;
bearing means between said hole cutter and said piercing element to guide said hole cutter relative to the work;
means carried by said support to load said spring, said means comprising
a first member fixed against rotation relative to said support, said first member having threads thereon extending axially of said barrel;
a second member having threads thereon extending axially of said barrel and in engagement with the threads of said first member, and
means connecting one of said members to said barrel for rotation therewith;
whereby rotation of said barrel causes one of said members to move axially of the other of said members to load said spring; and
latch means selectively operable to release said hammer means.

10. A low reaction tool comprising, in combination,
a support;
tool element mounting means on said support for mounting a tool element for movement about an axis;
drive means carried by said support and operatively coupled to said tool element mounting means to turn a tool element about said axis;
work engaging means connectable against rotation to the work to be operated on by a tool element on said tool mounting means,
said work engaging means including a work piercing element;
means carried by said support to punch said piercing element into the work independently of the operation of said drive means, said means comprising
a potential energy storing device carried by said support,
impact receiving means fixed to said piercing element,
manually operable means to actuate said potential energy source to drive said hammer against said impact receiving means; and
hammer means selectively drivable against said impact receiving means by said potential energy device; and
torque resisting means connected between said support and said work engaging means,
whereby reaction torque of a tool element operating on the work is resisted by the work itself.

11. A low reaction tool according to claim 10, wherein said potential energy storing device is a spring and which further includes
means operatively coupled between said tool drive means and said spring to selectively load said spring.

12. A low reaction tool according to claim 1, wherein said low reaction tool further includes
means operatively connected between said work engaging means and a tool element mounted in said tool mounting means to urge the tool element toward the work.

13. A hole cutting tool according to claim 7 wherein said means exerting a pull on said anchor is a spring; and which further includes
means to selectively load said spring to exert said pull on said anchor.

14. A hole cutting tool according to claim 13 wherein said means to selectively load said spring is operated by said means to rotate said cutter.

15. A cutting tool according to claim 9 wherein
said piercing element extends axially beyond said hole cutter whenever said hammer driving spring is loaded, and said latch means is responsive to axial displacement of said piercing element to release said hammer means.

References Cited

UNITED STATES PATENTS

| | | | |
|---|---|---|---|
| 493,730 | 3/1893 | MacKenzie | 77—69 |
| 831,152 | 9/1906 | Gerwig | 77—69 |
| 1,152,337 | 8/1915 | Nelson | 173—32 XR |
| 1,590,994 | 6/1926 | Misener | 77—13 |
| 2,573,462 | 10/1951 | Lindsey | 145—120 |
| 2,777,341 | 1/1957 | Marchant | 77—13 |
| 3,360,025 | 12/1967 | Gallo | 143—85 XR |
| 2,830,790 | 4/1958 | Kemper | 173—33 |
| 358,202 | 2/1887 | Jones | 173—32 |

FOREIGN PATENTS

| | | |
|---|---|---|
| 306,294 | 2/1929 | Great Britain. |
| 641,513 | 8/1950 | Great Britain. |

FRANCIS S. HUSAR, Primary Examiner

U.S. Cl. X.R.

173—32